(No Model.)
J. W. & Z. W. OGLESBY.
COTTON GIN FEEDER.
No. 293,772. Patented Feb. 19, 1884.
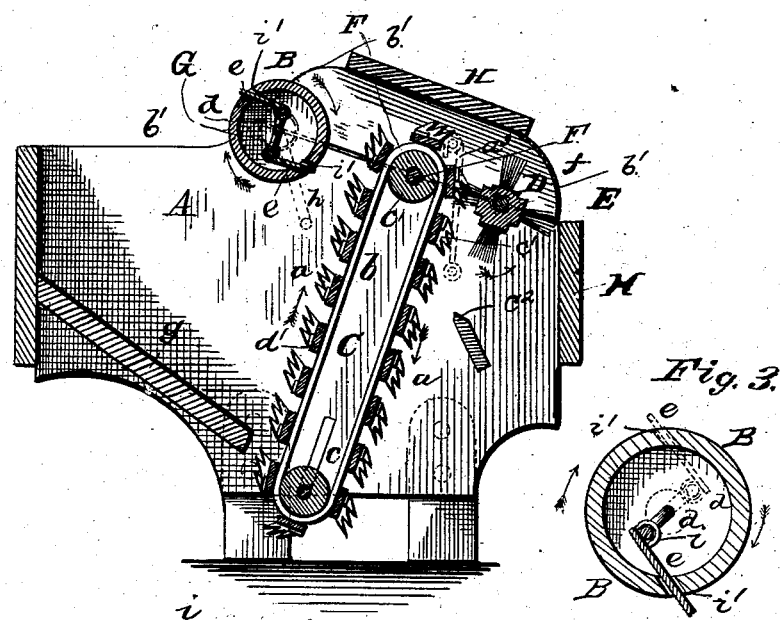
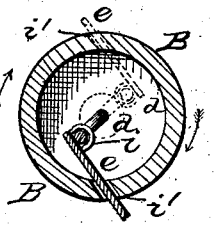
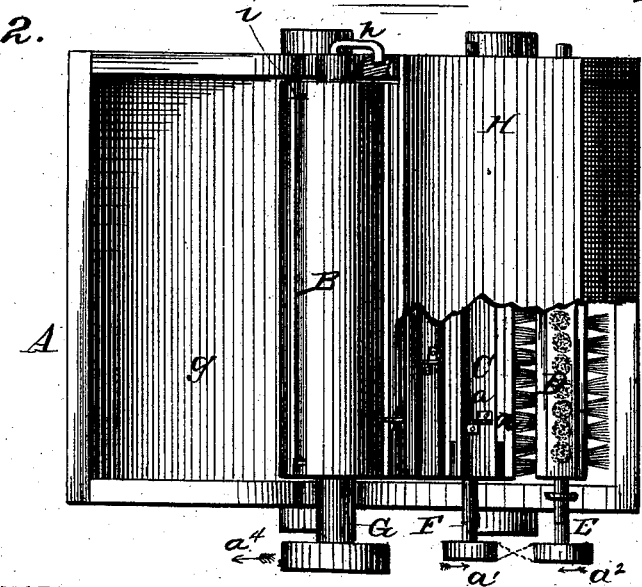
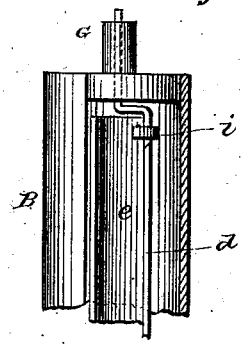
WITNESSES
Phil C. Dietrich
W. R. Keyworth
INVENTORS
James W. Oglesby
Zenos W. Oglesby
By Smith & Myers
Attorney.
N. PETERS, Photo-Lithographer, Washington, D. C.

UNITED STATES PATENT OFFICE.

JAMES WOOD OGLESBY AND ZENOS WISE OGLESBY, OF KINGSTON, GEORGIA.

COTTON-GIN FEEDER.

SPECIFICATION forming part of Letters Patent No. 293,772, dated February 19, 1884.

Application filed June 2, 1883. (No model.)

*To all whom it may concern:*

Be it known that we, JAMES WOOD OGLESBY and ZENOS WISE OGLESBY, citizens of the United States, residing at Kingston, in the county of Bartow and State of Georgia, have invented certain new and useful Improvements in Cotton-Gin Feeders; and we do hereby declare the following to be a full, clear, and exact description of the invention, such as will enable others skilled in the art to which it appertains to make and use the same.

Our invention relates to certain new and useful improvements in cotton-gin feeders.

The object of our invention is, to a certain extent, to separate the dust, stones, nails, or other débris from the cotton, partially disintegrate the cotton, and deliver the latter into the mouth of the gin evenly and in as light and flaky a form as possible, and dispense with manual labor to a great extent. We attain these objects by means of the peculiar construction and arrangement of the various parts of our device, which will be more fully pointed out and described in the specification and claimed.

Referring to the drawings accompanying this description and forming part of the same, Figure 1 is a vertical sectional view of our invention, showing the frame, the endless saw-toothed belt or apron, and sections of the feed-roller and brush. Fig. 2 is a top view of the same with cover broken away, showing operative parts. Fig. 3 is a cross-section of the feed-roller. Fig. 4 is a sectional plan, partly broken away, of the feed-roller.

Similar letters refer to similar parts throughout the drawings.

Reference being had to the drawings, A represents a frame or box, rectangular in shape, with a portion of the top or upper part covered with a section, H, having sides $a^3$, having downwardly-curved ends $b'$, its under edges being adapted to join with the upper edges of the box A, and be secured thereto by hooks, staples, or pins. The rear portion of said cover H is provided with a curved strip of wire-cloth, $f$, extending from one curved rear edge of each side to the other.

Centrally underneath the cover or top H is journaled a cross-shaft, F, having a fast pulley, $a'$, on its outer end, by which motion is communicated to said shaft. An endless belt, C, passes over the roller $c'$ on shaft F, and extends downward in an inclined position to and around a roller, $c$, journaled across the lower part of box A. Cross-slats $d'$ and projecting saw-teeth $a$ are secured to the outer face of the endless apron C, by which the cotton is carried forward and upward.

Parallel with and a short distance in rear of shaft F is journaled a shaft, E, carrying a series of projecting brushes, D, said brushes being arranged to brush the cotton off the saw-teeth $a$ as it is carried over shaft F by the endless apron C. A fast pulley, $a^2$, is secured to the end of shaft E, by which motion is received and transmitted to the other parts of the machine.

B represents a retarding-roller, whose office it is to knock back the superfluous cotton carried up from the board $g$ by the elevating saw-toothed belt C. This roller is mounted at each end upon a journal or short shaft, G, having bearing in the sides of the frame A, and also having at one end a pulley or drum, $a^4$, through which, by a belt or other suitable means, motion is imparted thereto. The retarding-roller B is hollow, as shown, and is provided with longitudinal slots $i'$ $i'$.

$d$ represents an eccentric or bent rod, which extends longitudinally through said roller, and at one end has a loose bearing within one of the short shafts or journals G, the other end of said eccentric-rod passing through the short shaft or journal at the other end of said roller B, and from thence is bent at right angles, and then inwardly into loop form, as shown at $h$, the inwardly-bent end being driven into or otherwise rigidly secured to the side of the frame.

$e$ represents plates or tongues, which are hinged to the eccentric-rod $d$ by staples $i$. These plates or tongues, as the roller B revolves, will, when the eccentric portion of the rod $d$ is opposite to the longitudinal slots $i'$, project outward through the same into operative position, for the purpose of knocking away and keeping back any superfluous cotton that may be carried upward, and as the roller B continues to turn until the non-eccentric portion of rod $d$ is opposite to the slots $i'$, the plates $e$ will be drawn backward and rest within the roller B until again forced through the slots thereof. The plates e are drawn backward within the cylinder and rest within the slots, but are at times protruded beyond the periphery of the cylinder, having their bearings on the edges bounding the slots i'. It will thus be seen that the operation of the plates or tongues is automatic, and that they are alternately thrust into and retracted from operative position as the roller d revolves.

The retarding-roller herein described and claimed is shown in our application filed May 25, 1883, Serial No. 96,114, but not therein claimed. An inclined cross-board, g, is placed near the bottom of said box, its upper edge resting against the inner face of the front cross-board, and extending downward to near the saw-teeth on the endless apron C, the purpose of which is to incline the cotton toward said saw-teeth. The space between the end of said piece g and the saw-teeth permits rocks, nails, dirt, &c., to pass out onto the floor beneath. The screen f permits fine dust and light trash to escape that is thrown outward by the brush D, but prevents the cotton from being thrown out or wasted.

Between the brush D and apron C, and underneath the same, is secured a sharp-edged cross-piece, $c^2$. Said cross-piece is attached by its ends to the inner faces of the sides of the box A, and serves to deflect the cotton downward into the mouth of the gin.

Having thus described our invention, what we desire to secure by Letters Patent is—

1. In a cotton-gin feeder, the combination of a box or frame, A, endless saw-toothed apron C, inclined feed-board g, adapted to feed the cotton to said saw-toothed apron, hollow retarding-roller B, having slots i', and eccentric-rod d, provided with plates or tongues e and loop h, substantially as and for the purpose set forth.

2. The combination of the box or frame A, retarding-roller B, having journals G, and an eccentric bent rod, d, within said roller, provided with hinged tongues e, one end of said rod extending out through the hollow journal G of roller B, and connected to box A, with the endless apron C, having saw-teeth a, shaft F, rollers c c', shaft E, carrying brush D, and the cover H, formed as described, and having curved wire screen f, substantially as shown and described.

In testimony whereof we affix our signatures in presence of two witnesses.

JAMES WOOD OGLESBY.
ZENOS WISE OGLESBY.

Witnesses:
J. M. DAVIDSON,
R. S. POPE.